United States Patent [19]

Dalquist et al.

[11] Patent Number: 4,796,776
[45] Date of Patent: Jan. 10, 1989

[54] PRESSURE COOKER FOR MICROWAVE OVENS

[75] Inventors: H. David Dalquist, Minnetonka; Jorgen A. Jorgensen, Bloomington; Lloyd G. Keleny, Champlin; Donald W. Nygren; John N. Taylor, both of St. Louis Park, all of Minn.

[73] Assignee: Northland Aluminum Products, Inc., Minneapolis, Minn.

[21] Appl. No.: 16,632

[22] Filed: Feb. 19, 1987

[51] Int. Cl.$^4$ .......................... B60L 1/02; B65D 51/16
[52] U.S. Cl. ..................................... 220/203; 220/209; 220/204; 220/319; 99/330
[58] Field of Search ................ 220/203, 202, 204, 208, 220/209, 229, 231, 315, 316, 319, 323, 366, 367, 378; 99/330, 369, 426, DIG. 14

[56] References Cited

U.S. PATENT DOCUMENTS

| 2,086,044 | 7/1937 | Nelson | 220/203 |
| 2,200,903 | 5/1940 | Stephens | 220/203 |
| 2,552,642 | 5/1951 | Morrison, Jr. | 220/203 |
| 3,055,536 | 9/1962 | Dieny | 220/203 |
| 4,024,982 | 5/1977 | Schultz | 220/319 |
| 4,592,479 | 6/1986 | Resende | 220/209 |

FOREIGN PATENT DOCUMENTS

| 79933 | 10/1955 | Denmark | 220/203 |
| 851395 | 10/1960 | United Kingdom | 220/319 |

Primary Examiner—Willis Little
Attorney, Agent, or Firm—Orrin M. Haugen; Thomas J. Nikolai; Frederick W. Niebuhr

[57] ABSTRACT

A pressure cooker for use in microwave ovens includes a microwave permeable bowl shaped container, a microwave permeable dome cover, and a steel locking ring permanently attached to the cover for maintaining the container and cover in fluid-tight seal during use. A safety valve, formed of flexible tubing, encounters a projection of the container and is deformed into a closed configuration responsive to movement of the cover, relative to the container, toward a locking position. A pressure regulator valve, consisting of a metal core surrounded by an elastically deformable casing, is positioned over a pressure control opening in the cover to maintain a selected operating pressure level in the pressure cooker. A pressure indicator and relief assembly, contained in a pressure release opening through the cover, indicates positive pressure in the chamber and is ejected in the event of an abnormally high pressure inside the housing.

17 Claims, 2 Drawing Sheets

PRESSURE COOKER FOR MICROWAVE OVENS

BACKGROUND OF THE INVENTION

This invention relates to preparation of food, and more particularly to an apparatus for pressure cooking food items in microwave ovens.

Pressure cookers are well known for their capacity to impart a highly desirable tenderness, texture and flavor to certain prepared foods, particularly meat. Pressure cookers usually include a bowl-shaped container or base open at the top for receiving food, and a top cover for closing the container. Because they utilize a positive pressure, these appliances must be equipped with certain features not required by other cooking utensils. For example, means must be provided for maintaining the container and cover in a fluid sealing engagement for maintenance of positive pressure. A valve is needed for maintaining a selected level of positive pressure. The cooker also should have a back-up pressure release valve, in case there is a malfunction in the pressure regulating valve. Finally, it is desirable to have auxiliary valve means for preventing positive pressure build-up unless the cover and container are properly engaged, and for rapid pressure release in the event of an attempt to open the pressure cooker prior to a sufficient release of positive pressure.

A pressure cooker container and top may be threadedly engaged, as disclosed in U.S. Pat. No. 4,490,597 to Mengel granted Dec. 25, 1984. A more convenient opening and closing arrangement is shown in U.S. Pat. No. 2,622,187 to Welch granted Dec. 16, 1952, in which the container and cover each are provided with ledges, which interlock with one another responsive to rotation of the cover. A gasket is provided to complete the seal. Welch utilizes the cover weight as a pressure regulator valve, while Mengel discloses a spring loaded regulator valve. Mengel also shows a safety relief button which, when pressed by the user, vents the pressure cooker.

U.S. Pat. No. 4,024,982 to Schultz granted May 24, 1977 discloses a ring rotatably mounted with respect to the cover or lid of a pressure cooker. The ring is equipped with handles for rotating it 180° between its open and closed positions. A valve seating, mounted in the lid, has a valve cone that remains open until the ring is rotated to the closed position, thus to prevent a pressure build-up unless the cooker is properly closed. An alternative structure, shown in U.S. Pat. No. 4,103,801 to Walker granted Aug. 1, 1978, includes a sealing plug in a cover vent opening. The plug is positioned so that it can rise to permit a pressure build-up only when a lock member is in its proper position.

Pressure cookers designed for use in microwave ovens are intended to afford the above-mentioned advantages of pressure cooking along with the convenience and speed of microwave cooking. These advantages give rise to certain structural requirements not heretofore adequately addressed. For example, it is desirable in microwave pressure cooking to construct the container and cover of a microwave permeable material. Yet, such materials do not lend themselves to the positive yet convenient closure desired for pressure cookers. The valves presently used to prevent pressure build-up prior to a proper seal are more complex than necessary, and often utilize metal springs and other components not suitable in microwave environment. Moreover, the characteristically smaller size of microwave pressure cookers raises the need to ensure that large, flat, bulky food items, for example lettuce and cabbage, do not interfere with operation of the pressure regulator valve or safety pressure release valve.

Therefore, it is an object of the present invention to provide a means for the convenient and releasable sealing of a pressure cooker cover and container, particularly when these components are constructed of a microwave permeable material.

Another object of the invention is to provide a simple and reliable means to prevent positive pressure in a pressure cooker chamber unless the cover and container are correctly engaged.

Another object is to provide a means for rapidly releasing pressure from a pressure cooker during an attempt to disengage the cover and container before the positive pressure has subsided.

Yet another object is to provide structure for preventing food items in a pressure cooker from blocking or otherwise interfering with pressure relief openings.

And, it is an object of the present invention to provide a pressure relief valve and auxiliary safety valve which are easily removed from the pressure cooker for inspection or cleaning.

SUMMARY OF THE INVENTION

To achieve these and other objects, there is provided a pressure cooker with a housing including a container open at its top and a cover adapted for a sealing engagement with the top of the container to close the housing. A valve opening is formed through the cover, and a fastening means releasably maintains the container and cover in the sealing engagement responsive to movement of the cover, relative to the container, to a locking position. A flexible valve means, mounted with respect to the valve opening, provides a fluid path between the interior and exterior of the housing. The valve means has a valve portion extended into the interior. The pressure cooker further includes at least one closure projection integral with the container. The valve portion is positioned to contact one of the closure projections as the cover is moved toward the locking position. Responsive to further movement of the cover towards the locking position, the valve means elastically deforms to close the fluid path and permit the maintenance of a positive pressure in the housing interior.

One feature of the invention resides in the fact that the valve portion does not contact a closure projection, and thus does not deform to close the fluid path, unless proper sealing engagement occurs between the container and cover. If the pressure cooker is not properly closed, the valve means provides a fluid path for steam and vapor to escape, preventing build-up of positive pressure inside the housing. Furthermore, as the cover is moved away from the locking position to open a closed pressure cooker, it carries the valve means away from the closure projection and re-opens the fluid path, permitting rapid escape of steam and vapor to reduce any positive pressure. This protects a user who mistakenly attempts to open the pressure cooker before pressure has subsided. The preferred valve means is a cylindrical length of tubing removably and frictionally mounted within the valve opening of the cover. Such tubing is readily removed for inspection or cleaning.

Another aspect of the present invention is a pressure cooker adapted for use in microwave ovens. The pressure cooker has a bowl-shaped container open at the top, constructed of a microwave permeable material and having an annular upper rim. A microwave permeable cover is provided, with an annular cover rim adapted for a sealing engagement with the annular upper rim of the container. A fastening means releasably joins the container and cover when in the sealing engagement. The fastening means includes a plurality of spaced apart first latching members integral with the cover and arranged about the cover rim. A plurality of spaced apart second latching members are integral with the container and arranged about the upper rim. The second latching members are positioned to allow each of the first latching members to descend between and below an associated pair of the second latching members as the cover is placed in the sealing engagement upon the container. Rotation of the cover with respect to the container, with the container and cover so engaged, moves each of the first latching members into an interlocking engagement with one second latching member of the associated pair. This forms a plurality of interlocked pairs, each including one first locking member and one second locking member. One locking member of each interlocked pair is constructed of a microwave permeable material, while the other latching member of the pair is constructed of metal.

Preferably, all of the first latching members are constructed of steel, and comprise part of a steel ring permanently attached to the cover rim. Consequently, with the container and cover microwave permeable, the steel ring provides the necessary tensile strength to permit use of the interlocking latching members to conveniently secure the cover and container.

A further aspect of the present invention is a pressure cooking apparatus including a housing, a generally cylindrical pressure release opening extended longitudinally through a wall of the housing from the interior to the exterior of the housing, and an elastically deformable generally cylindrical plug removably contained in the pressure release opening. The plug has a nominal diameter, with first and second radially outwardly extended flanges at opposite ends of the plug. The pressure release opening includes a medial portion having a diameter substantially equal to the nominal diameter, a first radially enlarged end portion at the housing exterior to accommodate the first flange, and a second radially enlarged portion at the housing interior to accommodate the second flange. An annular surface portion of the housing wall which forms the boundary between the medial portion and the second radially enlarged portion is inclined radially outward and longitudinally away from the surface.

Due to the inclination of the boundary surface portion, annular line contact is created between the boundary surface portion outer edge and the second flange of the plug. This results in a higher chamber pressure level before the plug is ejected, and also a more consistent ejection pressure level, as compared to a transverse orientation of such boundary surface portion.

Preferably, a plurality of relief elements are formed in the housing interior surface near the pressure release opening. This prevents large, relatively flat and deformable food items such as lettuce, from blocking the pressure release opening.

IN THE DRAWINGS

For a better appreciation of these and other features and advantages, reference is made to the following detailed description and the accompanying drawings, in which.

DETAILED DESCRIPTION OF THE PREFERRED EMBODIMENT

Figure 1:
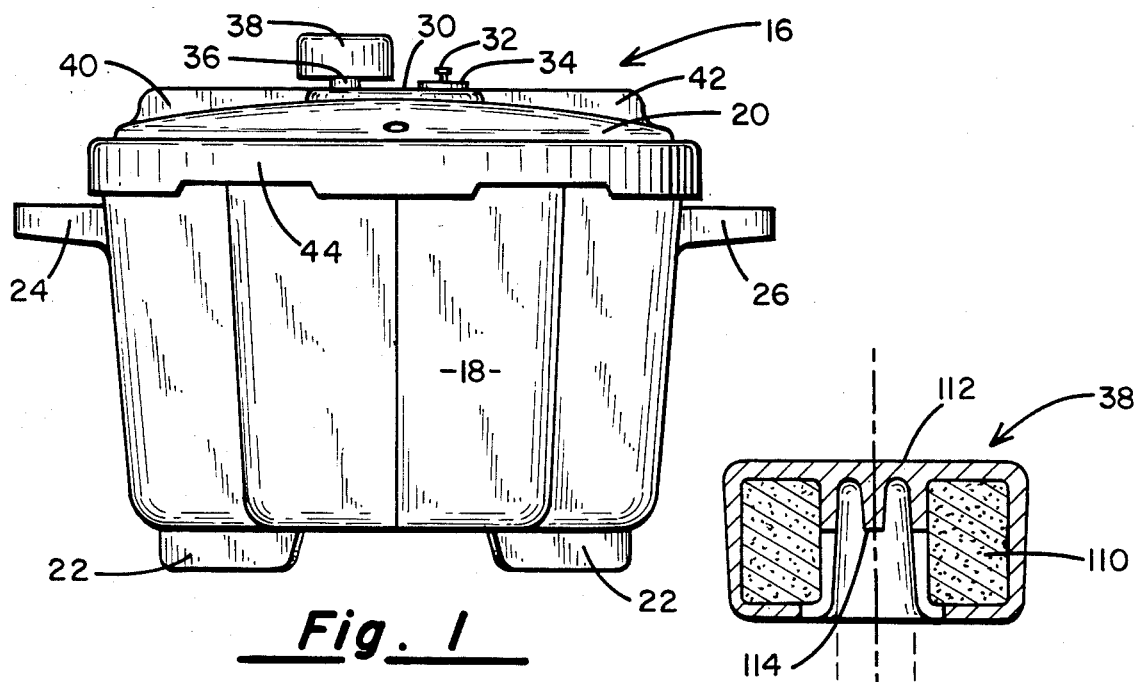
FIG. 1 is a front elevation of a pressure cooker constructed in accordance with the present invention.

Turning now to the drawings, there is shown in FIG. 1 a pressure cooker 16 particularly well adapted for use in microwave ovens. The pressure cooker has a housing including a bowl-shaped container 18 open at its top for receiving food, and a cover 20 in the shape of a dome and adapted for sealing engagement with container 18 to close the pressure cooker and enable maintenance of a positive pressure inside the housing. Container 18 and cover 20 preferably are formed of a thermoset polyester resin, or other material permeable to microwave energy.

Formed as an integral part of container 18 are a plurality of feet 22 for supporting the container with respect to a counter or the floor of the microwave oven, not shown. Handles 24 and 26 are provided on opposite sides of the container near its top. Near the periphery of cover 20 is a cut-out 28 for accommodating a pressure relief safety valve which extends through the cover. A flat landing 30 is formed at the center of cover 20, and supports a pressure indicator and release assembly including a plastic stem or poppet valve 32 and a silicone plug or grommet 34 supporting the stem and contained in an opening through cover 20. A stand 36, extending upwardly from landing 30, supports a pressure control valve 38. Extended radially outward from landing 30, in opposite directions, are first and second wings 40 and 42, formed as part of cover 20 and enabling convenient manual rotation of the cover with respect to container 18, about a vertical axis. A steel locking ring 44, permanently mounted to cover 20, secures the cover and container in their sealing engagement as is later explained.

Figure 2:
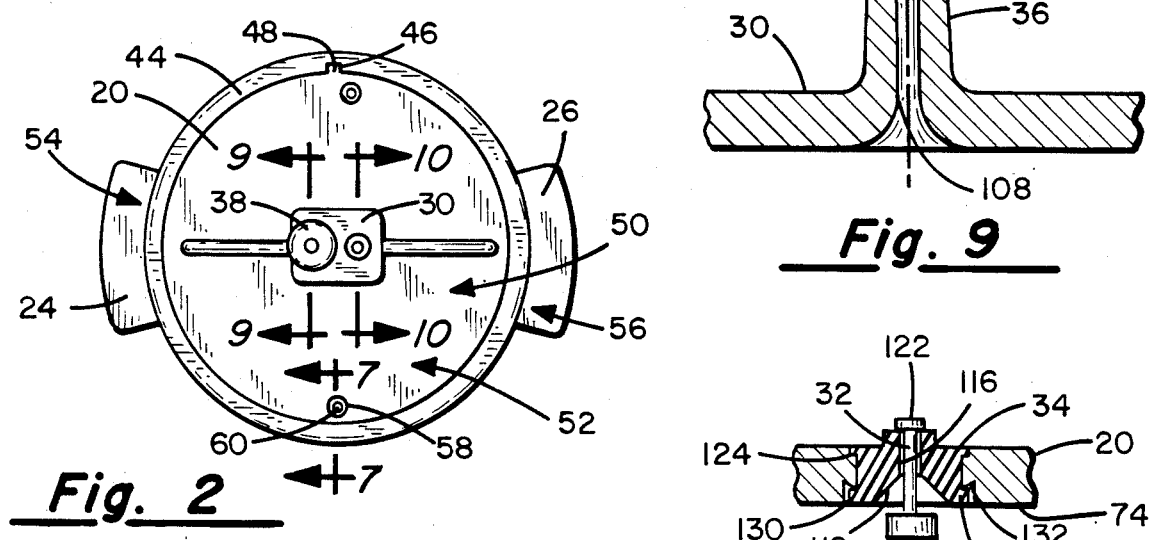
FIG. 2 is a top plan view of the pressure cooker of FIG. 1.

As seen in FIG. 2, locking ring 44 is provided with a rectangular notch 46. A rise 48 in cover 20, of a size and shape similar to notch 46, fits snugly within the notch to ensure a proper angular alignment of ring 44 with cover 20 prior to its permanent attachment. First and second markers 50 and 52, each formed as a raised portion on cover 20, indicate whether the cover, relative to container 18, is in its open unlocked or locked angular position. More particularly, first and second handle markers 54 and 56 are provided on handles 24 and 26, respectively. The alignment of second marker 50 with either handle marker indicates that the pressure cooker is properly locked, while the alignment of marker 52 with either handle marker indicates the closed, but unlocked position.

A pressure relief safety valve 58 extends through cover 20 to provide fluid communication between the interior and exterior of the pressure cooker, by means of a pressure relief orifice 60 through the valve.

Figure 3:
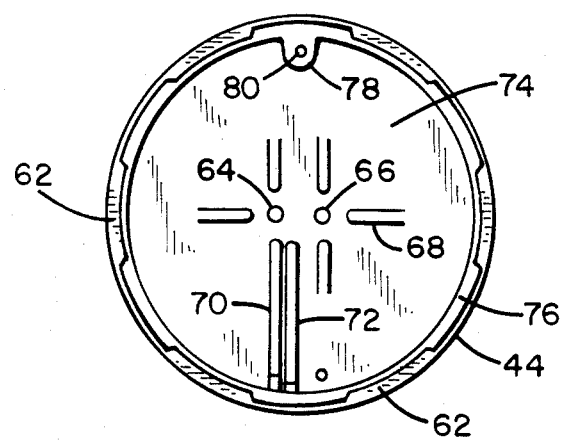
FIG. 3 is a bottom plan view of a cover of the pressure cooker.

FIG. 3 shows the bottom or inside surface 74 of cover 20, to reveal six latching members 62 forming a part of locking ring 44 and extended radially inward from the remainder of the ring at the bottom thereof. A pressure release opening 64 contains grommet 34 and poppet valve 32 during use of the pressure cooker, but these components are readily removed from opening 64 for cleaning or inspection. Near opening 64 is a smaller pressure control opening 66, likewise extended through the cover.

A plurality of relief elements or raised portions are formed into cover 20 proximate openings 64 and 66, including five relatively short relief elements 68, and a pair of parallel spaced apart ribs 70 and 72 extended from the cover periphery to a point near the pressure release opening. These relief elements prevent relatively large, flat and pliable food items, for example leaves of lettuce or cabbage, from lying against the cover inside surface 74 to block or otherwise interfere with openings 64 and 66.

A rim 76 of cover 20 is specially shaped to accommodate an annular gasket used to seal the cover and container 18. Formed near rim 76 is a boss 78 through which is formed valve opening 80 for containing safety valve 58.

Figure 4:
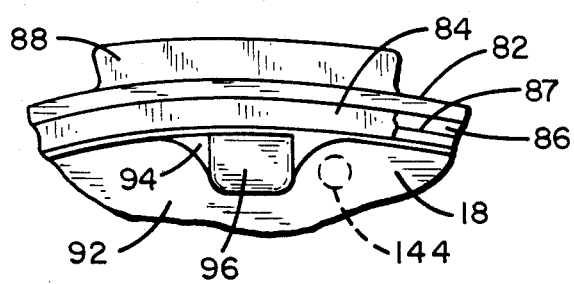
FIG. 4 is a partial top view of the pressure cooker with the cover removed.

In FIG. 4, a portion of container 18 is shown in top view with cover 20 removed, in order to show an upper rim 82 of the container, and part of an annular gasket 84 which fits into a groove 86 formed in upper rim 82 and into a corresponding groove in the cover to effect a positive fluid seal between container 18 and cover 20 when the pressure cooker is locked. A sealing ridge 87 in groove 8 cooperates with gasket 84 to seal the housing. Also shown at 88 is one of six container latching members, each of which extends radially outward from upper rim 82, and is adapted for an interlocking engagement with one of latching members 62 of locking ring 44. Like latching members 62, container latching members 88 span approximately 30° of angular rotation, and are spaced apart from each other approximately 30°.

Figure 5:
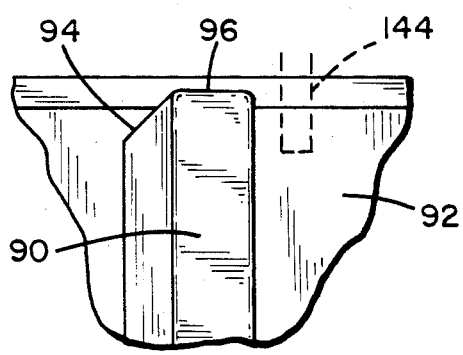
FIG. 5 is a partial interior side elevation of a container of the pressure cooker.

As seen from FIGS. 4 and 5, a closure projection 90 extends radially inwardly from the inside surface 92 of container 18. The closure projection spans most of the container height, but is particularly useful in that it provides an inclined camming surface 94 which extends upwardly at an angle of approximately 45°, and a horizontal retaining or crimping surface 96 adjacent the upper end of the camming surface. A substantially identical second closure projection, not shown, extends radially inwardly from inside surface 92 opposite closure projection 90, i.e. angularly spaced apart 180°.

Figure 6:
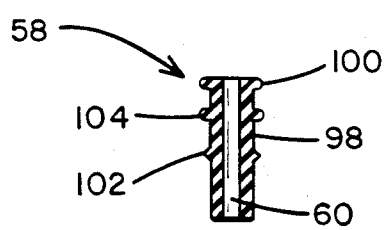
FIG. 6 is a side view of pressure relief safety valve removed from the cover.

Safety valve 58, shown as removed from valve opening 80 in FIG. 6, has a cylindrical body 98 of a nominal diameter, for example 0.25 inches. At the top of valve 58 is a radially outwardly extended flange 100. An indicator ring 102 is formed in the valve near its longitudinal center. Approximately midway between ring 102 and flange 100 is an annular raised portion 104 designed to frictionally secure valve 58 within valve opening 80.

Pressure relief orifice 60, formed longitudinally through the valve, has a diameter of ⅛ inch.

Figure 7:
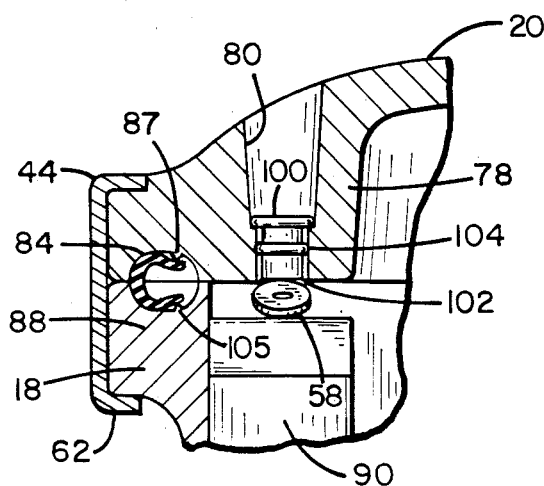
FIG. 7 is a sectional view taken along the line 7—7 in FIG. 2.

FIG. 7 shows safety valve 58 contained within valve opening 80 of cover 20 and crimped between boss 78 and closure projection 90. Flange 100 rests within a radially enlarged portion on a ledge of the opening. The remainder of opening 80 has a diameter substantially the same as the valve nominal diameter. As a result, raised portion 104 is elastically compressed and thus frictionally maintains valve 58 within opening 80. Indicator ring 102 lies just below the bottom or inside surface of boss 78. When a user, having inspected or cleaned safety valve 58, re-inserts the valve into opening 80, ring 102 emerges from the bottom of the opening to indicate that the valve has been properly inserted.

Also seen in FIG. 7 is the manner in which each latching member 62 of locking ring 44 interlocks with an associated one of container latching members 88 to secure the sealing engagement of the container and cover. Six container latching members, each spanning approximately 30° arc, are symmetrically arranged about upper rim 82. Similarly, latching members 62 are symmetrically arranged on locking ring 44. The latching members are so arranged, that when cover 20 is placed upon container 18 with first marker 50 aligned with either handle marker, each latching member 62 descends between an associated pair of container latching members 88, to a point below the associated pair. Rotation of cover 20, relative to container 18 toward the locking position, moves each of latching members 62 into an interlocking engagement with one of its associated container latching members 88, namely the one to its clockwise side as viewed in FIG. 2. Thus, with cover 20 in the locking position, six interlocking pairs are formed, each pair including a latching member 62 and a container latching member 88.

With the cover and container locked together, gasket 84, responsive to a positive pressure inside the housing, elastically deforms to provide a fluid tight seal between the cover and container. More particularly, an annular sealing ridge 105 is formed in a groove 107 in rim 76, radially aligned with ridge 87. The free ends of generally C-shaped gasket 84 are directed radially inward as shown in FIG. 7, each end associated with one of ridges 87 and 105. A positive pressure inside the housing urges the annular end portions of gasket 84 away from one another, pinning each against its associated sealing ridge to form the required seal. To enhance the seal, each of ridges 87 and 105 has opposite, inclined side walls converging to a sealing edge. Because each sealing edge is relatively sharp, its associated end portion is bent around it, responsive to positive pressure, in a wrapping engagement to improve the seal. The edges are not so sharp, however, as to cause any damage to gasket 84.

Figure 8A:
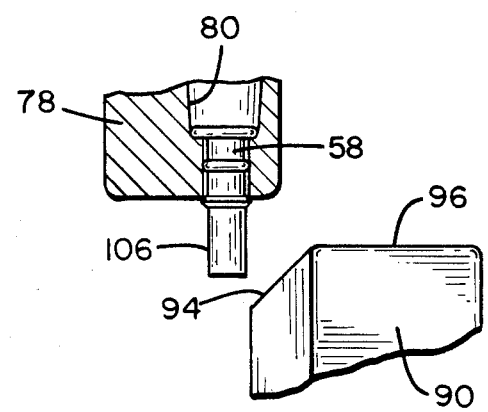
FIGS. 8a–8c illustrate operation of the pressure relief safety valve and closure projection.
Figure 8B:
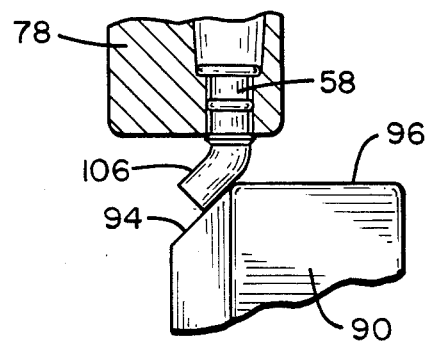
Figure 8C:
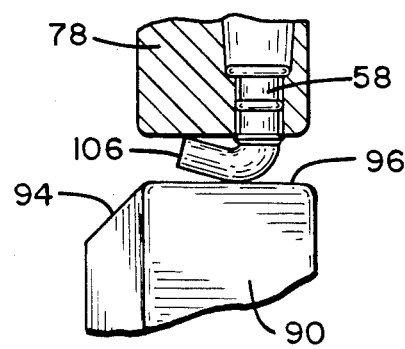

As cover 20 is rotated into its locking position, safety valve 58 is crimped to close off the fluid path provided by orifice 60. This crimping or closure of valve 58 is illustrated in FIGS. 8a–8c. FIG. 8a shows the position of safety valve 58—including a valve portion 106 of the valve extending into pressure cooker 16—relative to closure projection 90 after some movement of cover 20 toward its locking position. In FIG. 8b, as the cover is further rotated toward its locking position, valve portion 106 is carried into contact with camming surface 94 of the closure projection and is bent. Finally, with cover 20 completely locked, boss 78 has been carried rightward beyond the majority of retaining surface 96, leaving valve portion 106 trailing and held between the boss and retaining surface, crimped sufficiently to close the fluid passage otherwise provided by the valve orifice.

It can be appreciated that a substantially identical locking sequence would occur between valve 58 and the other closure projection. Should cover 20 initially be improperly positioned on container 18, safety valve 58 would not encounter either closure projection during locking. Hence, pressure relief orifice 60 would remain open, preventing a positive pressure build-up following such improper closure.

Safety valve 58 also can protect an operator who attempts, improperly, to open the pressure cooker before positive pressure has subsided. From considering FIGS. 8a–8c in a reverse sequence, it is understood that unlocking cover 20 involves moving boss 78 and valve 58 leftward as viewed in these figures. The arcuate dimensions of latching members 62 and cover latching members 88 are selected such that they remain at least partially interlocked even with valve portion 106 free of camming surface 94 as pictured in FIG. 8a. Valve 58 is made of a silicone with sufficient elastic memory properties to rapidly restore the valve to its normal configuration. A silicone with a durometer of about 50 has been found satisfactory. As a result, steam and vapor quickly escape through orifice 60, depleting the positive pressure.

Figure 9:
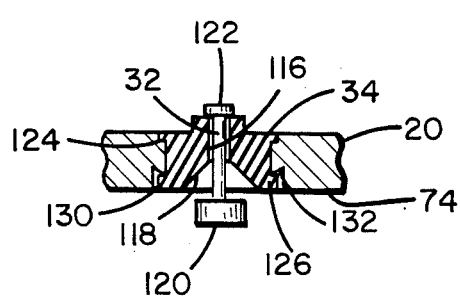
FIG. 9 is a sectional view taken along the line 9—9 in FIG. 2.

FIG. 9 shows stand 36 extended from flat landing 30. Running through the stand and through the remainder of cover 20 is a pressure control orifice 108. Pressure control valve 38 includes an annular metal core 110 surrounded by a polymer casing 112. A nodule 114 is formed in the casing, and normally rests inside pressure control orifice 108 as pressure control valve 38 is supported by stand 36. A sufficient build-up of positive pressure in the pressure cooker, however, forces control valve 38 to temporarily rise, permitting escape of steam and vapor. The weight of control valve 38 is selected to permit the escape of steam and vapor whenever the pressure inside the pressure cooker exceeds a predetermined level, for example ten pounds per square inch. Casing 112 protects stand 36 from any damage from the impact of valve 38 as it falls upon the stand and vibrates against it.

Figure 10:
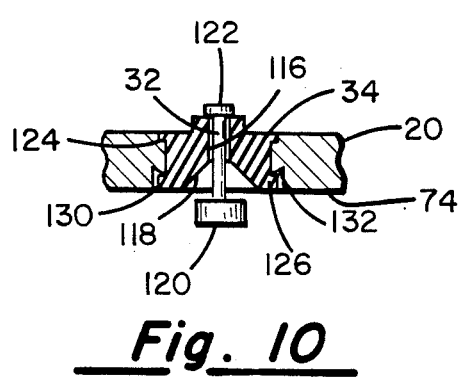
FIG. 10 is a sectional view taken along the line 10—10 in FIG. 2.
Figure 11:
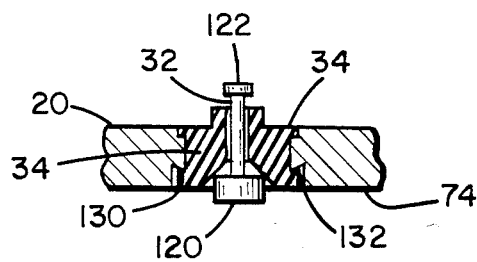
FIG. 11 is a view similar to that of FIG. 10, but with a positive pressure inside the pressure cooker.

FIG. 10 shows the pressure relief assembly including grommet 34 and poppet valve 32 housed in pressure release opening 64 of the cover. A central bore 116 through the grommet has a flared portion 118 at the bottom to receive an enlarged base 120 of pressure indicator poppet valve 32. Valve 32 has an enlarged top portion 122 which maintains the valve within grommet 34.

Grommet 34 has a nominal diameter of 0.625 inches, with radially outwardly extended upper and lower flanges 124 and 126, respectively. Release opening 64, in turn, has a first radially enlarged portion at the cover outside surface to accommodate flange 124, and a second radially enlarged portion 130 at inside surface 74 to accommodate flange 126. An annular boundary 132 between enlarged portion 130 and the medial part of opening 64 is inclined, radially outward and upwardly (longitudinally) away from inside surface 74. As a result, flange 126 is bent upwardly responsive to positive pressure, as shown in FIG. 10. Also in response to positive pressure, base 120 becomes seated in flared portion 118 of bore 116, raising enlarged top 122 above grommet 34, to provide to the user a visual indication of a positive pressure inside the pressure cooker. Due to the incline of border or boundary 132, grommet 34 is prevented from a premature ejection. At the same time, should there be a severe rise in positive pressure due to a malfunction of pressure control valve 38, grommet 34, and valve 32 are forced upwardly out of pressure release opening 64. In practice, the normal desired internal pressure is ten pounds per square inch, and the grommet is fashioned to exit the pressure relief opening when the internal pressure exceeds twenty pounds per square inch.

Thus is disclosed a pressure cooker particularly well suited for use in microwave ovens. The grommet 34 acts as a safety valve and is released in the event of excessive pressure. By contrast, the poppet valve rises responsive to even slight positive pressure to indicate its presence. The steel locking ring and polyester resin latching members provide a convenient and secure seal between the cover and container, yet also permit the cover and container to be constructed of microwave permeable material. The safety valve, in an inexpensive, simple and reliable manner, prevents positive pressure build-up unless the cover is properly locked against the container, and further allows rapid escape of steam and vapor in the event of an attempt to unlock and remove the cover before positive pressure has subsided.

What is claimed is:

1. A pressure cooker including:
   a housing including a container open at its top and a cover adapted for a sealing engagement with said container to close the housing, means forming a valve opening through said cover, and a fastening means for releasably maintaining said container and cover in said sealing engagement responsive to movement of said cover, relative to said container, to a locking position;
   a flexible valve means, mounted with respect to said valve opening, for providing a fluid path between the interior and exterior of said housing, said valve means including a valve portion extended into said interior; and
   at least one closure projection integral with said container; said valve portion being positioned to contact one of said closure projections as said cover is moved toward said locking position; and, responsive to further movement of said cover toward the locking position, elastically deforming to close said fluid path and permit the maintenance of a positive pressure in said housing interior.

2. The pressure cooker of claim 1 wherein:
   said valve means comprises a generally cylindrical length of tubing removably and frictionally mounted within said valve opening, with said valve opening located at the periphery of said cover, and with each closure projection located at the periphery of said container.

3. The pressure cooker of claim 2 wherein:
   said valve opening has a ledge near the outside surface of said cover, and said tubing includes a flange at one end thereof adapted for seating engagement against said ledge.

4. The pressure cooker of claim 2 wherein:
   said tubing has an annular raised portion contained in said valve opening when said flange is so engaged, the outside diameter of said annular portion being larger than the diameter of said valve opening.

5. The pressure cooker of claim 4 wherein:
   said tubing has a means for providing a visual indication, at the inside surface of said cover, that said flange is so engaged.

6. The pressure cooker of claim 5 wherein:

said tubing has a durometer of approximately 50.

7. The pressure cooker of claim 1 wherein:

each of said closure projections includes an inclined camming surface initially encountered by said conduit portion during said movement toward said locking position, and a horizontal retaining surface for maintaining said valve portion in a deformed, path closing configuration.

8. The pressure cooker of claim 1 wherein:

said fastening means includes a plurality of spaced apart first latching members integral with said cover and arranged about the cover periphery, and a plurality of spaced apart second latching members integral with said container and arranged about an upper rim of said container, said second latching members positioned to permit each of said first latching members to descend between and below an associated pair of second latching members as said cover is seated upon said container, said movement of said cover toward said locking position moving each first latching member into an interlocking engagement with one of said associated pair of second latching members to form a plurality of interlocked pairs, each pair consisting of one first latching member and one second latching member.

9. The pressure cooker of claim 1 including:

a pressure control opening formed through said cover, and a pressure control valve member including a metallic core surrounded by an elastically deformable casing, said casing including a nodule normally inserted into said pressure control opening; the weight of said core and casing and the diameter of said nodule being selected such that said valve member is lifted away from said pressure control opening whenever the pressure in said housing interior exceeds a preselected level.

10. The pressure cooker of claim 1 wherein:

said cover and container are constructed of a microwave permeable material.

11. The pressure cooker of claim 1 including:

a gasket, generally C-shaped in cross-section and having two opposite end edge portions; means forming a first groove in said cover and a second groove in an upper rim of said container; and a first ridge in said first groove and running the length thereof, and a second ridge in said second groove and running the length thereof; wherein said gasket, with said cover in said locking position, is contained between said first and second grooves, with each of said end edge portions lying against an associated one of said ridges; a positive pressure in said housing causing each end edge portion to elastically deform about its associated ridge to effect said sealing engagement.

12. A pressure cooker adapted for use in a microwave oven comprising:

a bowl-shaped container open at the top, constructed of a microwave permeable material and having an annular upper rim;

a microwave permeable cover having an annular cover rim adapted for a sealing engagement with the annular upper rim of said container; and a fastening means for releasably joining said container and cover in said sealing engagement, said fastening means including a metal locking ring surrounding and permanently attached to said cover at said cover rim and extended below said cover rim, said ring having a plurality of spaced apart first latching member arranged about a bottom portion of said locking ring and extended radially inwardly thereof; and a plurality of spaced apart second latching members integral with said container, arranged about the upper rim, and constructed of a microwave permeable material;

said second latching members positioned to allow each of said first latching members to descend between and below an associated pair of said second latching members as said cover is placed in said sealing engagement upon said container, rotation of said cover with respect to said container, with said container and cover so engaged, moving each of said first latching members into an interlocking engagement with one second latching member of said associated pair, thus to form a plurality of interlocked pairs, each interlocked pair including one first latching member and one second latching member.

13. The pressure cooker of claim 12 wherein:

said locking ring is formed of steel.

14. The pressure cooker of claim 13 including:

means forming a notch in said ring, and a rise in said cover having a size corresponding to the size of said notch, for angularly aligning said ring and said cover rim prior to their permanent attachment to one another.

15. A pressure cooking apparatus including:

a housing, a generally cylindrical pressure release opening extended longitudinally through a wall of said housing from the interior to the exterior thereof, and an elastically deformable generally cylindrical plug removably contained in said pressure release opening;

a plurality of relief elements formed in said interior surface and proximate said pressure release opening;

said plug having a nominal diameter, and having first and second radially outwardly extended flanges at its opposite ends;

said pressure release opening including a medial portion having a diameter substantially equal to said nominal diameter, a first radially enlarged end portion at said housing exterior to accommodate said first flange, and a second radially enlarged portion at said housing interior surface to accommodate said second flange; and wherein an annular boundary between said medial portion and said second radially enlarged portion is inclined radially outward and longitudinally away from said interior.

16. The apparatus of claim 15 wherein:

means form a longitudinal valve bore through said plug, and a poppet valve is movably contained in said bore for providing, outside of said housing, a visual indication of a positive pressure inside of said housing.

17. The apparatus of claim 15 wherein:

said housing includes a container open at the top thereof and a cover adapted for a sealing engagement with said container to close said housing, wherein said pressure release opening extends through said cover near its center, and wherein said relief elements include a pair of parallel, spaced apart ribs extended from the periphery of said cover to a location near said pressure release opening.

* * * * *